United States Patent [19]

Wienen et al.

[11] Patent Number: 5,139,809

[45] Date of Patent: Aug. 18, 1992

[54] FOOD PRODUCT MADE FROM A CAROTENOID-FREE CORN STARCH

[75] Inventors: Wanda Wienen, Griffith; Susan Furcsik, Lake Station, both of Ind.; David Mauro, Dolton, Ill.; Ibrahim Abbas, Munster, Ind.; Robert Friedman, Chicago, Ill.

[73] Assignee: American Maize-Products Company, Stamford, Conn.

[21] Appl. No.: 630,529

[22] Filed: Dec. 20, 1990

[51] Int. Cl.$^5$ ............... A23L 1/0522; A23L 1/187; A23L 1/24

[52] U.S. Cl. ..................... 426/578; 426/579; 426/658; 426/661; 426/589; 127/32; 127/71

[58] Field of Search ............... 426/578, 579, 658, 661; 127/32, 71

[56] References Cited

U.S. PATENT DOCUMENTS

| | | | |
|---|---|---|---|
| 4,303,451 | 12/1981 | Seidel et al. | 426/578 |
| 4,368,212 | 1/1983 | Heckman | 426/578 |
| 4,374,860 | 2/1983 | Gasser et al. | 426/48 |
| 4,477,480 | 10/1984 | Seidel et al. | 426/578 |
| 4,806,377 | 2/1989 | Ellis et al. | 426/808 |

*Primary Examiner*—Jeanette Hunter
*Attorney, Agent, or Firm*—Lucas & Just

[57] ABSTRACT

The carotenoid component of corn starch was found to contribute to the corn flavor of the corn starch. The food product made with a carotenoid-free starch which has been extracted from a corn kernel is bland in flavor.

14 Claims, No Drawings

FOOD PRODUCT MADE FROM A CAROTENOID-FREE CORN STARCH

This invention relates to food and, more particularly, to a food product which contains a corn starch component wherein the starch component consists essentially of a carotenoid-free corn starch that has been extracted from a corn kernel. A food product made from a carotenoid-free corn starch is bland in flavor.

Corn starch is recognized as one of the main sources of food for man and is typically grouped into three main categories, common or dent, waxy and high amylose. Starch is a polymer of anhydroglucose units bonded together by alpha 1,4 and alpha 1,6 bonds. Polymers of anhydroglucose units bonded by only alpha 1,4 bonds are referred to as amylose while polymers of anyhydroglucose units containing both alpha 1,4 and alpha 1,6 bonds are referred to as amylopectin. The size of the polymers and the ratio of bond types varies from species to species as well as within any one given species.

Conventional thinking was that common corn starch contains about 75% amylopectin and about 25% amylose. High amylose corn starch contains at least 35% amylose and normal, commercial high amylose corn starch contains 50% to 70% amylose. Waxy corn starch contains about 99% amylopectin.

Conventionally, starch is extracted from the corn kernel through a wet milling operation which includes grinding the kernels and then separating the starch granule from the germ, gluten and fiber. A starch granule is comprised of both carbohydrate and non-carbohydrate material. The non-carbohydrate material includes lipids and proteins.

Corn starch has a slight corn flavor which is imparted to food made from corn starch. In certain foods, such as corn chips or corn bread, the flavor is expected and desired; however, in foods such as mayonnaise or vanilla pudding, the corn flavor from the starch is undesirable.

Conventional thinking held that removal of the lipid and protein components of the starch granule eliminated the slight corn flavor. Methods to remove the lipid and protein components were generally solvent extraction techniques which were done only at great expense. This left starches such as tapioca starch and potato starch as the only starches applicable for use in food where bland flavor was important.

Applicants have now discovered that the corn flavor contained in the starch granule is not due just to the lipid and protein components alone but also to the carotenoid component of the granule. Significant reduction of the carotenoid component from the starch results in a starch having a bland flavor and a colorless appearance. Applicants have also discovered that carotenoid-free corn starch behaves similarly to conventional carotenoid-containing corn starch in food, making it suitable as a 1:1 replacement for all food applications where bland flavor is important.

The term "carotenoid-free" as used in the specification and claims means that the xanthophyll component has been significantly reduced, specifically, at least about 90–99%, preferably 95–99%. of the xanthophyll component has been eliminated from the starch based on the weight of carotenoid in the starch. The carotenoid component is eliminated either through plant breeding techniques, genetic engineering or through chemical processing. Plant breeding is the preferred technique.

Applicants have further discovered that modified carotenoid-free corn starch can replace modified yellow corn starch and produce a foodstuff that is both bland and has improved color.

Applicants have found that carotenoid-free corn starch has the same chemical and physical attributes of its counterpart yellow corn starch, thereby making the carotenoid-free corn starch behave in a substantially similar manner to yellow corn starch except without the yellow color and corn flavor. This has been found to be true for both the modified and non-modified carotenoid-free corn starches.

Carotenoid compounds comprise a class of chemical compounds which are pigments. Within the class of carotenoid compounds that are found in corn are beta-carotene ($C_{40}H_{56}$) and specifically, xanthophyll ($C_{40}H_{56}O_2$). Xanthophyll is one of the most widespread carotenoid alcohols available and is attributed for producing the characteristic yellow color in corn.

Carotenoid-free starch can be made by removing the carotenoid components from the starch; however, such a process is, at best, restricted to a laboratory scale process and not suited for commercial operation at this time.

Applicants prefer to use a corn starch obtained from maize which is homozygous in the recessive gene white, i.e. whwh. Such a starch is obtained through standard plant breeding techniques. The term whwh corn starch means not only a corn starch that has been extracted from corn kernels that are obtained from maize, that is homozygous genotype whwh, but also white corn starch wherein the whwh recessive genes have been moved to another portion of the plant genome by translocation, inversion or any other type of chromosome engineering to include variations thereof whereby a starch is produced which is carotenoid-free. Such a starch contains virtually no carotenoid component.

Suitable carotenoid-free starches include white waxy starch, white common starch and white high amylose starch. A white waxy corn masa has been suggested for use in snack food, see U.S. Pat. No. 4,806,377 issued Feb. 21, 1989. Masa is a product produced by soaking the whole kernel in an aqueous calcium hydroxide solution at a temperature of between about 80° C. to 100° C. for a period of about one hour and then additional water is added to cool the slurry. The kernel is then allowed to soak for up to 16 hours to obtain a moisture content of about 50%. Once the desired moisture is obtained, the kernels are ground to form a product referred to as masa. Masa is not suitable for use in many food applications because of the presence of the hull, gluten and germ. The starch used in the present invention is carotenoid-free and has been extracted from the corn kernel, making it substantially free of the hull, gluten and germ.

A starch containing foodstuff is made in accordance with the present invention using a starch component consisting essentially of a carotenoid-free corn starch. Preferably, the carotenoid-free corn starch is selected from the group consisting of white waxy, white common and white high amylose.

Applicants have found that carotenoid-free corn starch can be used to replace conventional carotenoid containing starch, yellow corn starch, on a 1:1 weight basis.

The carotenoid-free starch of the present invention can be subject to an acid or enzyme treatment to form a starch hydrolysate which is useful in foods.

In order to acid treat the starch of the present invention, a slurry of starch about 5 to about 40% by weight starch is prepared. This slurry is reacted with acid, generally a strong acid, at a temperature above gelatinization temperature. Such a procedure is preferably carried out by jet cooking the slurry through a conventional jet cooker with or without acid already in the slurry and then allowing the slurry to react with the acid, adding acid if needed, for a desired period of time or until the desired dextrose equivalent (DE) is reached. The DE is roughly proportional to the length of time for the reaction. Generally, such jet cooking destroys the starch's granular structure.

After acid treatment, the resulting slurry is neutralized, dewatered and dried. Such product may also be subject to conventional carbon treatment and filtration prior to dewatering and drying. Another treatment which degrades the granular structure is enzyme treatment.

In order to enzyme treat the starch of the present invention, a slurry of starch is made up having about 5 to about 40% by weight starch. To this slurry, enzyme is added at the optimum pH and temperature for the enzyme. Some advantage is found by first jet cooking the slurry to open up the starch granules, cooling the slurry to optimum temperature for the enzyme and then adding the enzyme. If the enzyme is jet cook stable, then the enzyme can be added to the slurry prior to jet cooking. The slurry may also be treated with acid first to a low DE and then enzyme treated. After enzyme treatment, the product is dewatered and dried. Alternatively, the product may be subject to conventional carbon bleaching and filtration prior to concentration and/or drying.

The carotenoid-free starch of the present invention can be modified to improve the physical and chemical characteristics of the starch granule while still maintaining a suitable product for use in food. Suitable modifications include etherification, crosslinking, esterification and combinations thereof.

In order to etherify the starch of the present invention, a slurry of starch is made up having about 5 to about 40% by weight starch. The pH of the slurry is adjusted to about 10 to about 12 preferably with sodium hydroxide. Next, an etherification agent such as ethylene oxide or propylene oxide is added to the slurry in an amount of about ½ to about 25% depending on the desired degree of substitution. The reaction conditions are held for about 6 to about 30 hours at about 70° to about 120° F. The slurry is then neutralized with any known acid, washed, dewatered and dried.

In order to crosslink the starch of the present invention, a slurry of starch is made up of about 5 to about 40% by weight starch. The pH of the slurry is adjusted to about 8 to about 12 preferably with sodium hydroxide. Optionally, a salt may be added to the slurry to affect swelling of the granules. Then the slurry is reacted with a crosslinking agent such as phosphorous oxychloride, trimetaphosphate salt, or epichlorohydrin at about 70° to about 120° F. for about ½ to about 5 hours. The length of time of the reaction will depend on the amount of crosslinking agent used and the specific crosslinking agent chosen.

In order to esterify the starch of the present invention, a slurry of starch is prepared having about 5 to about 40% by weight starch. The pH of the slurry is then adjusted to about 7 to about 10 and a esterification agent is added to the slurry such as vinyl ester, acetyl halides, acid anhydrides like acetic anhydride or succinic anhydride. The esterification agent is added slowly while maintaining the pH of the slurry. The reaction is continued for about ½ to about 5 hours at about 80° to about 120° F. Once the reaction is completed to the desired degree of substitution, the slurry is neutralized, washed, dewatered and dried.

Any combination of these modifications may be employed on starch of the present invention.

These and other aspects of the present invention may be more fully understood with reference to the following examples.

EXAMPLE 1

This example compares the flavor of carotenoid-free corn starch to conventional corn starch.

Four slurries were made from each of the following corn starches.

TABLE A

| Sample | |
|---|---|
| 1 | white waxy corn starch |
| 2 | yellow waxy corn starch |

Starch slurries were prepared for each sample starch identified in Table A at both 5 and 10% solids. These four slurries were then heated to 90° C. (194° F.) and held there for about 5 minutes during which gelatinization occurred, dissociation of the starch granules. The starch pastes were then evaluated by a trained taste panel using a triangle difference test. To evaluate, each panelist was given 20 mL of each paste. The results from this test were as follows:

TABLE B

| Sample Concentration | Identification of Odd Sample | |
|---|---|---|
| | Correctly | Incorrectly |
| 5% | 17* | 4 |
| 10% | 15* | 6 |

*significant at confidence level of p = 0.999.

In this test, there were 21 panelists. Each panelist was given three samples where two of the samples were the same and one was different. The panelists were asked to determine which two of the three samples were the same. The numbers are reported in Table B above.

This example illustrates the flavor difference between the two types of corn starch.

EXAMPLE 2

This example illustrates making a hydroxypropyl crosslinked white waxy corn starch for use in food.

A slurry of white waxy corn starch in granular form is prepared at a solids level of about 35% by weight. The temperature of the slurry is adjusted to about 80° F. (27° C.) and the pH of the slurry is adjusted to about 11. Propylene oxide is added to the slurry in an amount of about 8.0% by weight dry starch. The propylene oxide is added slowly and under agitation the propylene oxide reacts to form hydroxypropylated starch. The starch slurry is heated to 110° F. (43° C.) rapidly. The reaction is complete at a 3.0% add-on level. The pH of the slurry is then adjusted to about 9 and phosphorous oxychloride is added in an amount of 0.06% by weight dry starch. The reaction is allowed to proceed for about 30 minutes and then stopped by neutralizing the slurry to a pH of about 6.0. The product is then washed and dried.

EXAMPLE 3

This example illustrates making a white sauce from a white waxy corn starch and the chemically modified white waxy corn starch of Example 2 above.

The white sauces were made from the following formulation:

TABLE C

| Component | Amount (% wt) |
|---|---|
| Whole milk | 84.5 |
| Oil | 8.7 |
| Starch component | 6.8 |

The white sauce was made by combining the oil and the milk with the starch component and then heating the mixture to about 90° C. (194° F.) and holding the mixture at that temperature for about 5 minutes.

EXAMPLE 4

This example illustrates making vanilla pudding made from a white waxy corn starch and the chemically modified white waxy corn starch of Example 2 above.

The vanilla puddings were made from the following formulation:

TABLE D

| Component | Amount (% wt) |
|---|---|
| Whole milk | 85.40 |
| Sugar, granular | 9.00 |
| Starch component | 5.40 |
| Salt, table | 0.05 |
| Vanilla | 0.05 |

The vanilla pudding was made by mixing the components together, heating the mixture to 90° C.(194° F.) and holding it there for about 5 minutes.

EXAMPLE 5

This example illustrates making an imitation mayonnaise using a white waxy corn starch and the chemically modified white waxy corn starch of Example 2 above.

The imitation mayonnaise was made from the following formulation:

TABLE E

| Component | Amount (% wt) |
|---|---|
| Oil | 40.0 |
| Egg yolk | 4.5 |
| Vinegar | 3.9 |
| Sugar | 3.3 |
| Starch component | 3.5 |
| Mustard flour | 0.9 |
| Salt | 0.7 |
| Water | 43.2 |

The mayonnaise was made by forming a mix from all the components except the oil and egg yolk, heating the mix to 90° C. (194° F.) and holding the heated combination at 90° C. (194° F.) for 10 minutes. Next, the mixture was cooled to room temperature and then the oil and egg yolk were mixed in. Finally, the mixture was milled in a conventional manner to form a stable emulsion.

EXAMPLE 6

This example illustrates making a spoonable salad dressing using a white waxy corn starch and the chemically modified white waxy corn starch of Example 2 above.

The salad dressing was made from the following formulation:

TABLE F

| Component | Amount (% wt) |
|---|---|
| Oil | 30.0 |
| Egg yolk | 4.5 |
| Vinegar | 4.6 |
| Sugar | 4.0 |
| Starch component | 4.1 |
| Mustard flour | 1.1 |
| Salt | 0.7 |
| Water | 51.0 |

The spoonable salad dressing was made in this example following the same procedure used to make the mayonnaise in Example 5 above.

EXAMPLE 7

The Brabender viscosity characteristics of white waxy corn starch and modified white waxy corn starch of Example 2 above were compared to the Brabender viscosity characteristics of the yellow corn starch and modified yellow corn starch.

It was found that there was no substantial difference between the Brabender amylographs for the white waxy corn starch and the yellow waxy corn starch. Likewise, it was found that there was no substantial difference between the Brabender amylographs of the modified yellow waxy corn starch and the modified white waxy corn starch.

EXAMPLE 8

It has been found that drum drying the carotenoid-free starch of the present invention increases the clarity of the paste made from such drum dried starch. In order to drum dry the starch, granular starch is passed through the nip of two opposing rollers which rotate in opposite direction and which are held at a temperature of about 320°-356° F. (160°-180° C.). The rollers are generally about 0.01 to 0.025 inches apart at the nip. The distance at the nip of the two rollers is varied to drop the moisture content from about 40% for the incoming slurry to about 6% for the outgoing product.

In this example, a paste was made from white waxy corn starch which had been drum dried using a single roller. This is a conventional drum drier sold under the brand name Gouda. A slurry of the drum dried starch was made and then heated to about 90° C. (194° F.). A paste was also made from a slurry of yellow waxy maize corn starch which had also been subject to the same drum drying process. The paste was made in the same manner as the white waxy maize paste. Both pastes started from slurries having a solids content of 5% by weight.

Both these drum dried starches were observed for clarity. The paste made from the carotenoid-free starch had superior clarity to the paste made from the yellow waxy maize starch which had also been drum dried.

It will be understood that the claims are intended to cover all changes and modifications of the preferred embodiments of the invention herein chosen for the purpose of illustration which do not constitute a departure from the spirit and scope of the invention.

What is claimed is:

1. A method for removing the flavor and color added to a foodstuff by a corn starch component comprising the step of: replacing all of the corn starch component in the foodstuff with a carotenoid-free starch which has been extracted from a corn kernel, thereby removing the color and the flavor added to the foodstuff by the corn starch component.

2. The method of claim 1 wherein the carotenoid-free corn starch is selected from the group consisting of white waxy corn starch, white common corn starch, white high amylose corn starch and whwh corn starch.

3. The method of claim 11 wherein the carotenoid-free corn starch is selected from the group consisting of modified white waxy corn starch, modified white common corn starch, modified white high amylose corn starch and modified whwh corn starch.

4. The method of claim 1 wherein the carotenoid-free corn starch is selected from the group consisting of white waxy corn starch and modified white waxy corn starch.

5. The method of claim 4 wherein the foodstuff is a white sauce.

6. The method of claim 4 wherein the foodstuff is a vanilla pudding.

7. The method of claim 4 wherein the foodstuff is an imitation mayonnaise.

8. The method of claim 4 wherein the foodstuff is a salad dressing.

9. The method of claim 1 wherein equal amounts by weight of the carotenoid-free corn starch are used to replace the corn starch.

10. The method of claim 1 wherein the carotenoid-free corn starch has been drum dried prior to addition to the foodstuff.

11. A foodstuff prepared by the method of claim 9.
12. A foodstuff prepared by the method of claim 4.
13. A foodstuff prepared by the method of claim 9.
14. A foodstuff prepared by the method of claim 10.

* * * * *

UNITED STATES PATENT AND TRADEMARK OFFICE
CERTIFICATE OF CORRECTION

PATENT NO.   : 5,139,809
DATED        : August 18, 1992
INVENTOR(S)  : Wanda Wienen et al.

It is certified that error appears in the above-identified patent and that said Letters Patent is hereby corrected as shown below:

Column 4, line 2, change "a" to --an--.

Column 7, line 10, change "11" to --1--.

Column 8, line 15, change "9" to --1--.

Signed and Sealed this

Seventeenth Day of August, 1993

Attest:

BRUCE LEHMAN

*Attesting Officer*   Commissioner of Patents and Trademarks